United States Patent [19]
Holdik et al.

[11] Patent Number: 5,976,717
[45] Date of Patent: Nov. 2, 1999

[54] COATING COMPRISING A PHOTOCHROMIC MATERIAL, A METHOD FOR ITS PRODUCTION AS WELL AS ITS USE

[75] Inventors: Karl Holdik, Ulm; Clemens Bechinger, Konstanz; Paul Leiderer, Allensbach; Eckehard Wirth, Friedrichshafen, all of Germany

[73] Assignee: DaimlerChrysler AG, Stuttgart, Germany

[21] Appl. No.: 08/769,743

[22] Filed: Dec. 19, 1996

[30] Foreign Application Priority Data

Dec. 19, 1995 [DE] Germany ............ 195 47 327

[51] Int. Cl.⁶ ................. B32B 9/00; G02F 1/03
[52] U.S. Cl. ............. 428/699; 428/432; 428/702; 359/241
[58] Field of Search ............... 428/199, 207, 428/938, 432, 689, 699, 701, 702; 359/241, 242, 248; 427/166, 331; 65/30.11; 204/901

[56] References Cited

U.S. PATENT DOCUMENTS

| | | | |
|---|---|---|---|
| 3,745,044 | 7/1973 | Letter | 117/211 |
| 4,148,661 | 4/1979 | Kerko et al. | 106/54 |
| 4,186,002 | 1/1980 | Heller et al. | 430/1 |
| 4,324,622 | 4/1982 | Deb | 430/63 |
| 4,772,700 | 9/1988 | Kawauchi et al. | 544/71 |
| 4,784,477 | 11/1988 | Miyagi et al. | 350/357 |
| 5,384,653 | 1/1995 | Benson et al. | 359/270 |
| 5,603,757 | 2/1997 | Mizuguchi et al. | 106/404 |
| 5,604,626 | 2/1997 | Teowee et al. | 359/265 |
| 5,628,934 | 5/1997 | Ohno et ala. | 252/586 |

FOREIGN PATENT DOCUMENTS

| | | |
|---|---|---|
| 33 45 639 | 4/1985 | Germany . |
| 52-7755 | 1/1977 | Japan . |
| 52-46814 | 4/1977 | Japan . |
| 55-133020 | 10/1980 | Japan . |
| 58-52619 | 3/1983 | Japan . |
| 58-105217 | 6/1983 | Japan . |
| 58-184132 | 10/1983 | Japan . |
| 59-226591 | 12/1984 | Japan . |
| 60-42738 | 3/1985 | Japan . |
| 06-130546 | 5/1994 | Japan . |

OTHER PUBLICATIONS

P.M.S. Monk et al., "Display Devices of Tungtic Oxide Contaioning Vandium or Calcium Sulphide as a Light Sensitive Layer" Electrochemica Acta, 38, pp. 2759–2764, 1993.

R.J. Colton, et al., "Photochromism and Electrochromism in Amorphous Transition Metal Oxide Films", Accounts of Chemical Research, 11, pp. 170–176, 1978.

B. Ohtani, et al., "Multiple–Mode Responsive Device/Photo and ElectroChromic Composit Thin Film of Tungsten Oxide with Titanium Oxide", Chemistry Letters, 1, pp. 295–298, 1988.

Bechinger et al., "Photochromic Coloration of $WO_3$ With Visible Light", Appl. Phys. Lett., vol. 68, No. 20, pp. 2834–2836 (1996).

Shigeseto, Photochromic Prosperties of Amorphous $WO_3$ Films, Jap. J. Appl. Phys., vol. 74, No. 7, pp. 4527–4533 (1993).

Bechinger et al., "On the Fundamental Role of Oxygen For the Photochromic Effect in $WO_3$" J. Appl. Phys., vol. 74, No. 7, pp. 4527–4533 (1993).

"Römpp Chemie Lexikon," (Chemical Encyclopedia), vol. 9, 1993 Georg Thieme Verlag, Stuttgart, New York, p. 3403.

*Primary Examiner*—Deborah Jones
*Assistant Examiner*—Stephen Stern
*Attorney, Agent, or Firm*—Evenson, McKeown, Edwards & Lenahan, P.L.L.C.

[57] ABSTRACT

The invention relates to a coating comprising a photochromic material, its production and its use. The photochromic material of the coating has an optically reversible photochromic effect, wherein the switching threshold is disposed outside of or in the boundary region of the visible range of the spectrum. According to the invention, the photochromic material is coated with an influencing material, so that the switching threshold of the coated photochromic material is shifted towards wavelengths longer than the switching threshold of the uncoated photochromic material.

26 Claims, 4 Drawing Sheets

COATING COMPRISING A PHOTOCHROMIC MATERIAL, A METHOD FOR ITS PRODUCTION AS WELL AS ITS USE

BACKGROUND AND SUMMARY OF THE INVENTION

The present invention relates to a coating comprising a photochromic material with an optically reversible photochromic effect, wherein the photochromic material has a switching threshold outside of or in the boundary region of the visible region of the spectrum, to a method of making a coating comprising a photochromic material with an optically reversible photochromic effect wherein the effect sets in at a certain wavelength, as well as to the use of such a coating.

According to the German textbook, "Römpp Chemisches Lexikon" (Chemical Encyclopedia), Volume 9, 1993 Georg Thieme Verlag, Stuttgart, N.Y., page 3403, a photochromic effect is described as the reversible property of a material, which is distinguished by a color change which takes place in the photochromic material when it is exposed to visible or ultraviolet light. However, some materials have a switching threshold for the onset of the photochromic effect which lies at the violet, high energy end of the visible region of the spectrum or at even shorter wavelengths, as a result of which the usability of such materials in the visible region of the spectrum is, at the very least, greatly limited.

It is an object of the present invention to increase the usability of photochromic materials in the optically visible spectral region of the electromagnetic spectrum.

This and other objects of the present invention are accomplished by a coating comprising a photochromic material coated with an influencing material such that the switching threshold of the coated photochromic material which forms a layer is shifted towards wavelengths longer than the switching threshold of the uncoated photochromic material.

The present invention further relates to a method wherein the photochromic material is acted upon by an influencing material.

By using an internal light effect, the switching threshold of the photochromic effect can be shifted to longer wavelengths and, thereby, to the optical region of the spectrum. As a result, less photon energy is required to utilize the photochromic effect. Since the sun has an intensity distribution within the visible region of the spectrum, in which the distribution maximum lies at a wavelength of about 500 nm, a large number of photons are available in daylight for the photochromic effect of the present inventive coating. This is expressed by a stronger absorption and, also a better coating color. Another advantage lies in the fact that, because of the shift in the switching threshold, a larger variety of lasers can now be used.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
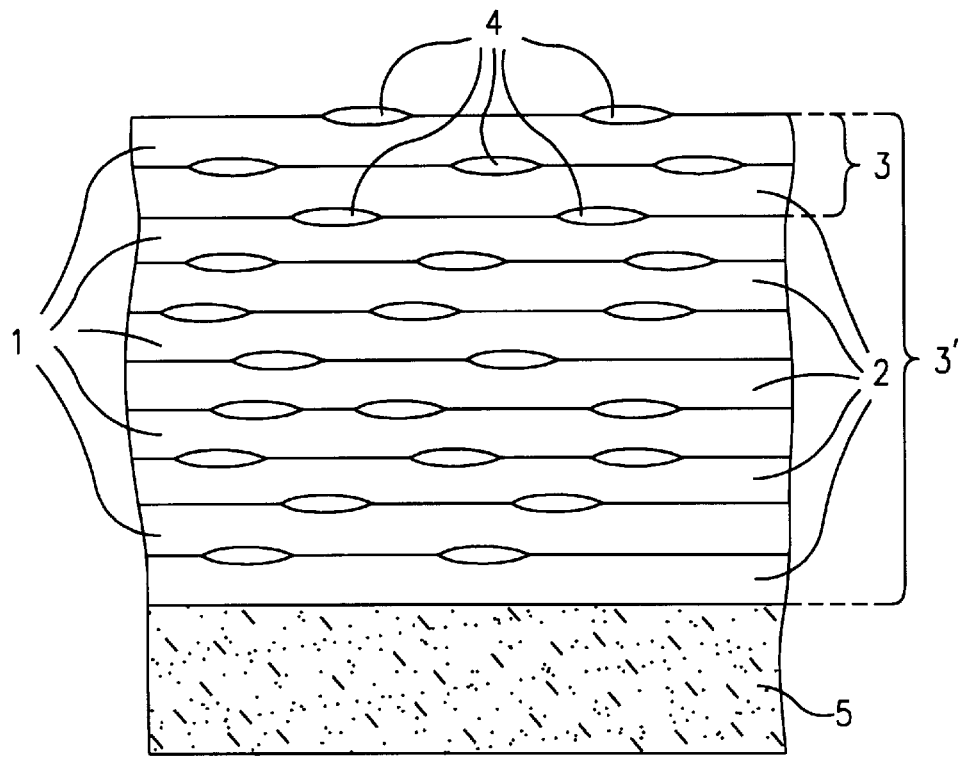
FIG. 1 is a cross-section of a glass substrate, on which layers of an influencing material and a photochromic material are vapor deposited.

FIG. 1 is a cross-section of a glass substrate 5 with a photochromic coating 3' which has been vapor-deposited on one side. The coating 3' has two alternating coating layers 3 of an influencing material 2 and a photochromic material 1. The influencing material 2 of the example is an amorphous, vapor-deposited, electrically semi-conducting cadmium sulfide (CdS), whereas the photochromic material 1 is an amorphous, vapor-deposited, tungsten oxide ($WO_3$). Alternatively, instead of using the CdS semi-conductor as the influencing material 2, it is also possible to use a semi-conductor material of the titanate group, the members of which are particularly resistant to photo-degradation.

By vapor-depositing the photochromic material 1 on a layer of influencing material 2, which has already been vapor-deposited on the glass substrate 5, the photochromic material 1 is in contact with influencing material 2 in such a manner that the contact is capable of transporting charge carriers.

Figure 2:
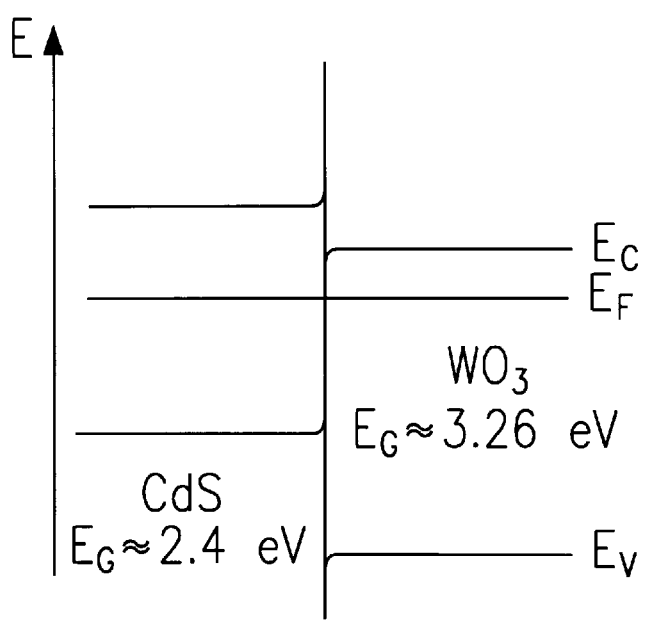
FIG. 2 is an energy diagram of the valence band and the conductivity band in the region of the interface between the influencing material and the photochromic material.

As can be seen in FIG. 2, the cadmium sulfide (CdS) influencing material 2 has a smaller energy gap $E_G$ between the electronic valence band ($E_v$) and the electronic conduction band $E_C$, wherein $E_G$=2.4 eV, than the $WO_3$ photochromic material 1, which has an energy gap of $E_G$=3.26 eV. In the region of the interface between two layers 3 of influencing material 2 and photochromic material 1, the bands approach one another at their respective Fermi level $E_F$, which is disposed at different distances from their respective conduction band $E_C$, such that the band of the inventive coating 3' has a discontinuity in the region of the interface between two layers 3 of influencing material 2 and photochromic material 1.

The influencing material 2 is selected such that charge carriers of the influencing material 2 can be activated within the optical spectral region. Furthermore, for at least one type of charge carrier, taking into consideration a possible potential barrier, there is a quantum mechanical transition matrix element with respect to the charge carrier transport between the influencing material 2 and the photochromic material 1 which is greater than zero. The potential barrier must be smaller than the difference between the energy gap of the photochromic material 1 and the energy gap of the influencing material 2.

If these conditions are observed, the switching threshold $S_1$ of the photochromic effect of the coating 3, 3', that is, the wavelength below which the photochromic effect of the coating 3, 3' sets in, is shifted to wavelengths longer than the switching threshold $S_2$ of the uncoated photochromic material 1 and to lower photon energies of irradiating light or irradiating electromagnetic waves.

Figure 3:
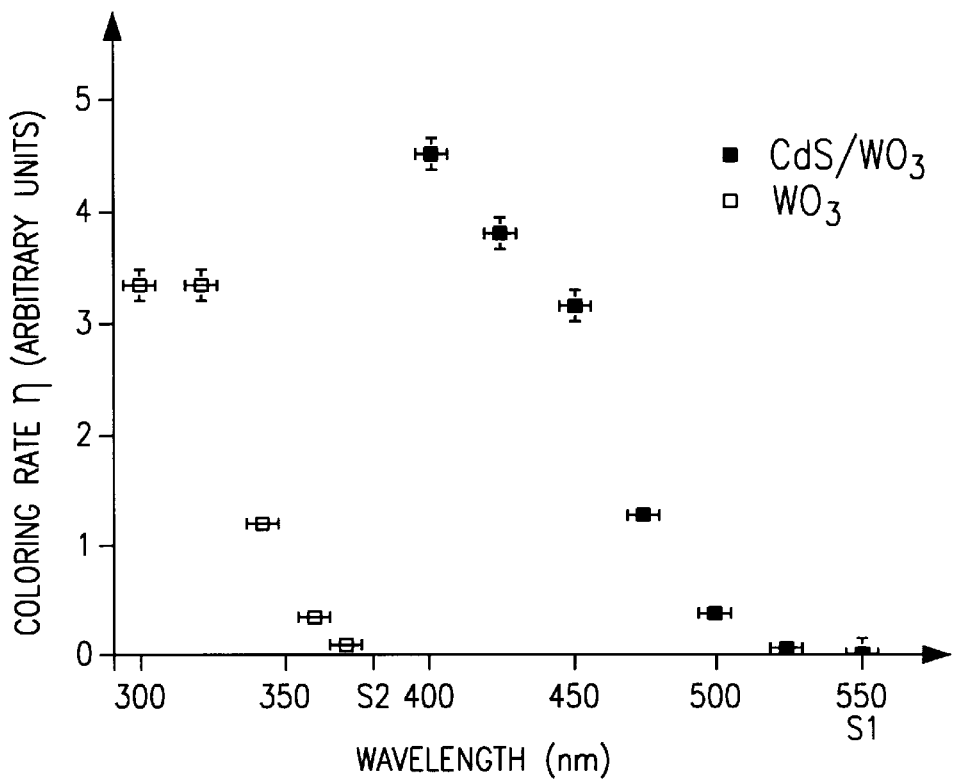
FIG. 3 is a diagram of the coloring rate as a function of the wavelength.

FIG. 3 is a diagram of this relationship. The wavelength-dependent coloring rate $\eta_{abs}$, which is a measure of the wavelength-dependent absorption, is plotted as a function of the wavelength $\lambda$ of the inventive CdS/WO$_3$ coating 3, 3' and for a layer of uncoated, photochromic WO$_3$. The intensity-corrected wavelength-dependent coloring rate $\eta_{abs}$ is the ratio of the measured coloring rate $\eta_{dir}$ to the intensity of irradiated light $I_{abs}$ ($\lambda$). The diagram clearly shows that the switching threshold $S_1$ of the inventive CdS/WO$_3$ coating 3, 3' lies at about 525 nm and, therefore, approximately 145 nm higher than the switching threshold $S_2$ of the uncoated WO$_3$, which lies at about 380 nm.

To produce an inventive CdS/WO$_3$ coating layer 3 as used in the diagrams of FIGS. 3 and 4, a glass substrate 5 was introduced into the receiver of a vacuum vapor-deposition apparatus and vapor coated first with CdS and subsequently with WO$_3$. The area of the glass substrate 5, which was cleaned in a known manner, was 12 cm$^2$. The distance between the glass substrate 5 and the vaporizer boat or vaporizer source was between 30 and 60 cm. The pressure was adjusted to $1.5 \times 10^{-5}$ mbar during vaporization of 1 to 2 g of 99.9% pure CdS for 140 seconds. The source, which held the CdS, was heated red hot, as a result of which the CdS was partially vaporized and deposited on the glass substrate 5 in a CdS layer 70 nm thick. The vapor-deposition of a 200 nm thick WO$_3$ layer followed at a pressure of $1.5 \times 10^{-5}$ to $2.5 \times 10^{-5}$ mbar, whereby approximately 1 to 2 g of WO$_3$ was vaporized.

The shift in the switching threshold $S_1$ is an absolute value, whereas the intensity of the coloring rate $\eta_{dir}$ or $\eta_{abs}$, that is, the measurement of the absorptive power of the inventive coating 3, 3' up to saturation, is a function of time.

Figure 4:
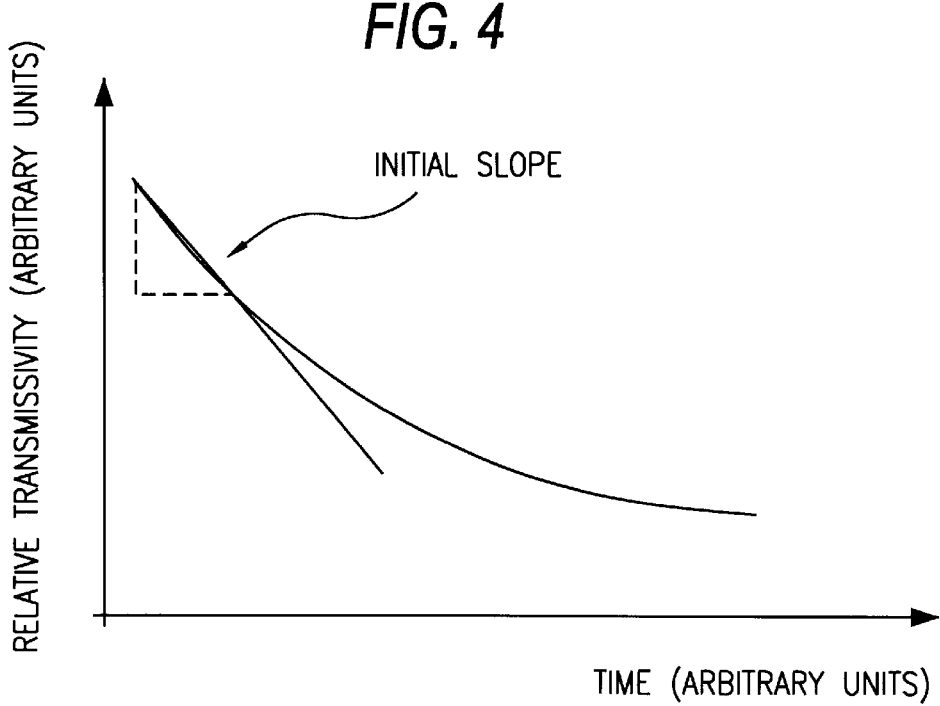
FIG. 4 is a diagram of the color as a function of time.

The diagram in FIG. 4 shows this relationship. To determine the coloring rate $\eta_{dir}$ of a CdS/WO$_3$ coating layer 3 as a function of time, the coating layer 3 was irradiated for different times at different places with light of a wavelength of 480 nm. As is evident from FIG. 3, this wavelength is below the switching threshold $S_1$ of the photochromic effect of the inventive coating 3, which is why the coating 3 is colored differently at different places depending on the time of exposure or irradiation.

To determine the coloring rate $\eta_{dir}$, the transmitted intensity, that is, the intensity of light which passes through the CdS/WO$_3$ coating 3 is measured. The wavelength of this light was 668 nm, which is above the switching threshold $S_1$ of the CdS/WO$_3$ coating 3 and also above the switching threshold $S_2$ of the uncoated photochromic material 1 WO$_3$. Before the measurement, the measurement beam was checked to ensure that the beam, which had a wavelength of 668 nm, produced no photochromic effects whatsoever in the CdS/WO$_3$ coating 3.

The transmissivity T(t) at a certain wavelength $\lambda$ as a function of time, can be described at least approximately by the exponential function of the formula:

$$T(t) = T(t_0) - A_S(1 - e^{(-t/\tau)}) \qquad \text{Eq. 1}$$

wherein $T(t_0)$ is the transmissivity at the starting time $t_0$, $A_S$ is the maximum absorption (saturation) of the CdS/WO$_3$ coating 3, t is a time after $t_0$ and $\tau$ is a time constant which corresponds to the initial slope of the T(t) curve and is a value between 10 and 60 sec for the present experiments.

In principle, the switching threshold $S_1$ of the inventive coating 3, 3' shifted from the switching threshold $S_2$ of the uncoated photochromic material 1 when the photochromic material 1 was coated with only a single layer of influencing material 2, that is, in the case of a double coating layer 3.

In this regard, two examples are given in the following Table 1. Sample 1 describes a double coating layer 3, in which a 70 nm layer of CdS and subsequently a 200 nm layer of WO$_3$ were applied on a glass substrate 5. In sample 2, the glass substrate 5 had a multiple coating layer 3' formed by five consecutive double coating layers 3, wherein each of the double coating layers 3 comprised a 10 nm thick CdS layer and a 40 nm thick WO$_3$ layer. Aside from the different thicknesses of the individual layers, the conditions for vapor-deposition were the same for samples 1 and 2.

Samples 1 and 2 were colored to saturation A with a laser having a wavelength of 480 nm, which is below the switching threshold $S_1$ of the respective CdS/WO$_3$ coatings 3, 3' of samples 1 and 2. The exposure time was between 5 minutes and two days. The coloring rate $\eta_{dir}$ was measured at a wavelength of 668 nm, which is above the switching threshold $S_1$ of the respective CdS/WO$_3$ coating 3, 3' of samples 1 and 2. As already mentioned, this light wavelength does not produce a photochromic effect.

The coloring rate $\eta_{dir}$ is defined as the first derivative with respect to time of the above transmissivity as a function of time T(t), so that:

$$\eta_{dir} = -A_S/\tau \cdot e^{(-t/\tau)} \qquad \text{Eq. 2}$$

TABLE 1

| Layer | $\eta_{dir}$ |
|---|---|
| Sample 1 (double coating) | 0.2 |
| Sample 2 (multi-coating) | 5.0 |

According to Table 1, the coloring rate $\eta_{dir}$ of sample 2 with a multi-coating 3', is 25 times as large as the corresponding coloring rate $\eta_{dir}$ of sample 1, formed from a single double coating layer 3. This comparison furthermore shows that the photochromic effect of the inventive coating 3', using the same mass, can be multiplied by use of plural coatings.

This indicates that, in the visible region of the spectrum, the coloring rate $\eta_{dir}$ of the photochromic effect of the inventive coating 3, 3' can be increased by increasing the contact area between the influencing material 2 and the photochromic material 1. Such an increase in contact area can be realized by applying individual layers of photochromic material 1 and influencing material 2 on the substrate 5, which consists particularly of glass, in a colloidal sol-gel process.

The coloring rate $\eta_{dir}$ of the inventive coating 3, 3' can be further increased by regionally introducing a reactive material 4 between the influencing material 2 and the photochromic material 1. This is demonstrated by preparing two samples 3 and 4 which correspond substantially to the above sample 1, which comprises a single double coating 3. However, in the case of sample 4, the CdS layer, after being vapor-deposited, was first treated with water vapor, before the WO$_3$ was vapor-deposited. Subsequently, the CdS/WO$_3$ coating 3 was irradiated with a red light at a wavelength of 668 nm, and the transmission of the red light was measured. As a result of the measurement, the coloring depth $f_S$, which correlates with the coloring rate $\eta_{dir}$, was determined. The results are shown in Table 2 below.

Based on the transmissivity T(t) as a function of time, the coloring depth is defined as follows:

$$f_S \equiv \frac{T(=0) - T(t \to \infty)}{T(t=0)} \qquad \text{Eq. 3}$$

wherein the coloring depth correlates to the coloring rate as follows:

$$\eta_{dir}(t=0) \sim f_S \qquad \text{Eq. 4}$$

TABLE 2

| Layer | $f_s$ |
|---|---|
| Sample 3 (CdS/WO$_3$) | 3.4% |
| Sample 4 (CdS/water vapor/WO$_3$) | 7.4% |

As is evident from Table 2, water, which was introduced into the interface between the influencing material 2 and the photochromic material 1 in sample 4, intensifies the photochromic effect of the CdS/WO$_3$ coating 3.

From the coloring behavior of WO$_3$ films, it is known that water is split into an oxygen radical and two hydrogen radicals under the action of light. With WO$_3$, the hydrogen radicals may form a tungsten bronze HWO$_3$, which is responsible for a blue coloration that is seen.

Therefore, the following explanations are possible. Electron hole pairs which originate from an internal light effect in the semi-conducting WO$_3$, participate in the formation of color centers in the inventive WO$_3$/CdS coating. In the case of a reaction between the hole of an electron hole pair and a hydrogen molecule, the positive charge can be transferred to the hydrogen because of the higher electronegativity of the oxygen.

This leads to the conclusion that, it is advantageous to make hydrogen available. Hydrogen can be preferably made available from substances such as platinum, which form hydrogen radicals and/or proteins. Moreover, nonvolatile substances which remain in the coating and contain hydrogen, which is linked by a polar bond and can be split off as a proton, such as polyvinyl alcohol and polysaccharide, are also preferred.

Since the influencing material 2 and the photochromic material 1 are vapor-coated under a vacuum of about $5 \times 10^{-5}$ to $1 \times 10^{-6}$ mbar, the reactive material 4 can be simply disposed between the two different layers of a coating 3, 3'. In the case of water with an addition of platinum, a small amount of platinum can simply be evaporated and subsequently the vapor deposition with the photochromic material 1 can take place in an atmosphere containing water vapor.

The reactive material 4, disposed in the interface of the different layers of photochromic material 1 and influencing material 2 of the coating 3, 3', reinforces the photochromic effect of the coating 3, 3'. It serves to increase the amount of tungsten of the photochromic coating 3, 3' that is reduced from the hexavalent reaction state to the pentavalent reaction state. Aside from water, nonvolatile substances, which remain in the coating and contain hydrogen, which is linked by a polar bond and can be split off as a proton, such as polyvinyl alcohol and polysaccharides, and combinations thereof are preferred as the reactive material.

Figure 5:
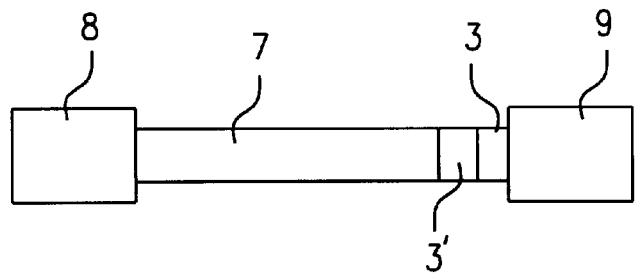
FIG. 5 is an optical memory unit using the photochromic coating for information or computer technology.

FIG. 5, shows an optical memory unit using the inventive photochromic coating 3, 3' for use in the information and computer technology. The memory unit is essentially a fiber-optic light guide 7, which has a light-emitting transmitter 8 at one end and a light-detecting receiver 9 at the other end. In ifs the fiber-optic light guide 7, which is made of a glass fiber, the inventive photochromic coating 3, 3' is disposed between the transmitter 8 and the receiver 9.

Preferably, the receiver 9 should be arranged directly adjacent to the coating 3, 3'.

When a semiconductor laser field is used as the transmitter 8, it is preferable for the receiver 9 to be a photodiode field. At least one photodiode should be assigned to each semiconductor of the laser array.

In cases where two lasers are used as the transmitter 8, it is preferable to use one of the lasers as a writing and refreshing laser, whereby its wavelength is selected below the switching threshold $S_1$ of the photochromic effect of the coating 3, 3'. The other laser is then used as a reading laser and preferably has a wavelength which is above the switching threshold $S_1$.

To write on the optical memory unit, the writing laser emits a light pulse of a specified duration as a result of which the coating 3, 3' becomes at least regionally colored. After a specified time, which can be determined from the diagram of FIG. 4, the coating 3, 3' is once again subjected to the light of the writing laser for a predetermined time in order to maintain a minimum coloration, which comprises the setting state of the memory unit. If this renewed exposure does not take place, the memory is erased, because the coloration of the coating 3, 3' will fade.

To read the optical memory unit, the reading laser emits a light pulse of known intensity. The intensity of the continuous light is measured by the receiver 9 with respect to the coating 3, 3' and assigned to a setting state or a non-setting state of the memory, depending on the activity remaining.

Figure 6:
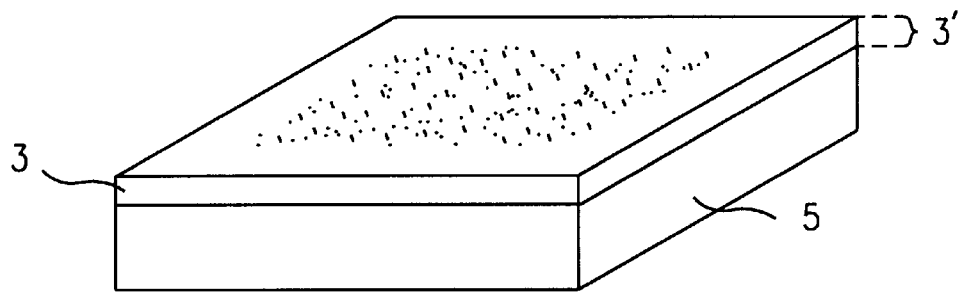
FIG. 6 is a glass substrate with a photochromic coating which is exposed with a holographic dot pattern.

In FIG. 6, the coating comprises a photochromic coating 3, 3' on a glass substrate 5, wherein the photochromic layer 3, 3' functions as an exposure layer similar to the photographic picture of a camera. In FIG. 6, the inventive photochromic coating 3, 3' is exposed to a holographic dot pattern. Because of the reversible property of the photochromic effect of the inventive coating 3, 3', after a certain time during which the coloring of the photochromic coating 3, 3' fades, the coating must be exposed to the dot pattern again to maintain the intended holography. In this application, the inventive coating 3, 3' represents a temporary holographic image memory.

Figure 7:
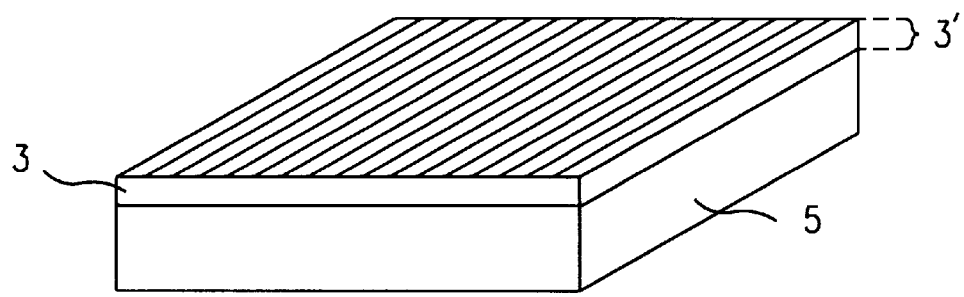
FIG. 7 is a glass substrate with a photochromic coating which is exposed with a line pattern forming an optical grating.

A different application of the present inventive layer 3, 3' as a temporary image memory is shown in FIG. 7. The basic construction of the coating of this example corresponds to that of FIG. 6. However, the stored image is a temporary ruled grating, for example, for producing electromagnetic wave interference. As a result of the fact that the grating which is produced by the coloration is only maintained for a specified time unless further measures are taken, it is possible to change, for example, the line spacing and other parameters of the grating selectively after a decay time, which can be determined from the decrease in the photochromatic effect. As a result, a simple possibility is provided, for example, of adapting an interferometer grating to different circumstances and requirements.

Figure 8:
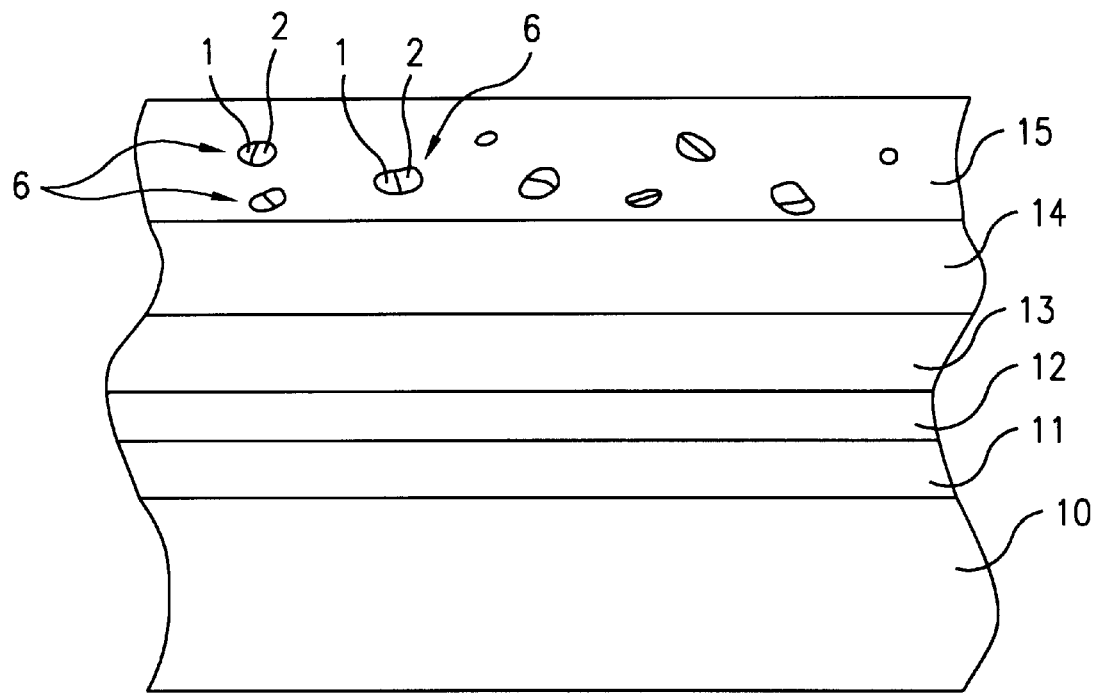
FIG. 8 is a cross-section of an effect paint for a motor vehicle body, wherein pigments comprising the photochromic coating were added to the paint.

FIG. 8 shows a cross-section of an effect paint for a motor vehicle body, in which pigments 6 comprising the inventive, photochromic coating, have been added to the effect paint. The use of such an effect paint is, of course, not limited to motor vehicle bodies, but can also be applied to other objects.

The paint structure, which is applied on the sheet metal 10 of a motor vehicle body, comprises a phosphatized coating 11, a priming coating 12, a filler coating 13, a color coating 14 and a clear lacquer coating 15. The pigments 6, which comprise the inventive coating 3, 3' with photochromic material 1 coated with the influencing material 2, are added to the clear lacquer coating 15.

The pigment 6 can be prepared by vapor-depositing the influencing material 2 and the photochromic material 1 on a substrate 5, such as a glass film several tens of μm thick and subsequently comminuting the glass film, on which the inventive coating 3, 3' was vapor deposited, thus forming the pigments 6. The average pigment size is preferably in the lower mm or below the mm range, particularly smaller than 100 μm. However, in order to avoid surface size effects, a size larger than 0.1 μm and, in particular, larger than 1 μm is preferred.

The inherent color of such a $CdS/WO_3$ coating 3, 3' is bluish or greenish, depending on the thickness of the CdS coating. For an inherent bluish color, the CdS coating, which has an inherent yellow color, must be sufficiently thin. When only the $CdS/WO_3$ layer 3, 3' is present, the bluish $CdS/WO_3$ layer 3, 3', in conjunction with, for example, a red color-producing colored coating 14, conveys the overall impression of the color of the effect paint as a function of the position of the sun. However, this color changes from red (without sun) to violet (with sun).

Figure 9:
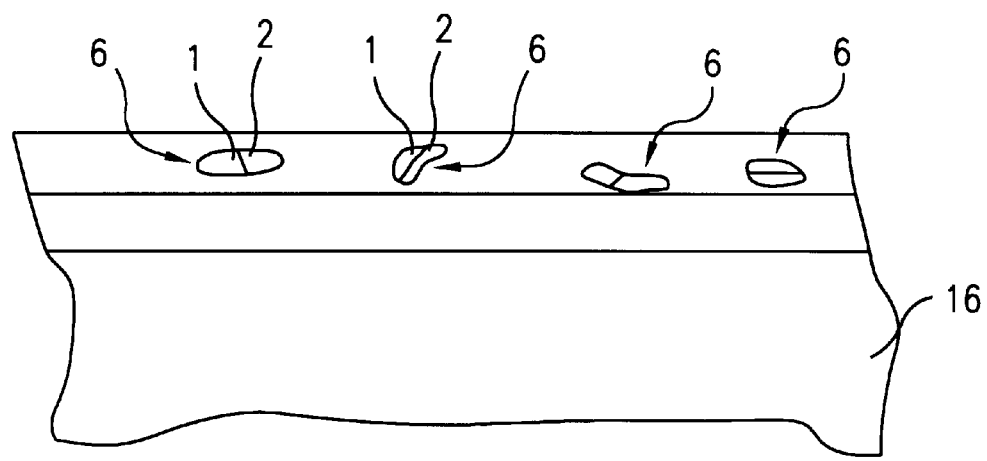
FIG. 9 is a cross-section of a paint structure for buildings comprising pigments which comprise the photochromic coating.

FIG. 9 is a cross-section of a paint structure which can be applied to a building 16, wherein the paint comprises pigments 6 which comprise the photochromic coating 3, 3'. Such a paint coating can also be applied to glass to produce insulating building windows or motor vehicle windows.

Buildings 16 or glass, coated with the present inventive, photochromic layer 3, 3', serve to independently minimize heating of interior spaces by the sun, particularly the passenger space of a motor vehicle and especially of a passenger vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A coating material for a substrate, comprising:
   a photochromic material with an optically reversible photochromic effect, wherein the photochromic material has a switching threshold outside of the visible region of the spectrum, and
   an influencing material coated on said photochromic material such that the switching threshold of the coated photochromic material is shifted toward wavelengths longer than the switching threshold of the photochromic material and into the visible region.

2. The coating of claim 1, wherein the photochromic material is tungsten oxide.

3. The coating of claim 1, wherein the photochromic material is amorphous.

4. The coating of claim 1, wherein
   the photochromic material is in contact with the influencing material and the contact is capable of transporting charge carriers,
   the photochromic material and the influencing material each have an electronic valence band, an electronic conduction band, and an energy gap between the electronic valence band and the electronic conduction band, wherein the energy gap of the influencing material is smaller than the energy gap of the photochromic material,
   the charge carriers of the influencing material can be activated within the optical spectral range,
   for at least one charge carrier, taking into consideration a possible potential barrier, there is a quantum mechanical transition matrix element with respect to the charge carrier transport between the influencing material add the photochromic material which is greater than zero, and
   the potential barrier is smaller than the difference between the energy gap of the photochromic material and the energy gap of the influencing material.

5. The coating of claim 4, wherein the influencing material is amorphous.

6. The coating of claim 4, wherein the photochromic material is tungsten oxide and the influencing material is a semiconductor material.

7. The coating of claim 4, wherein the photochromic material is tungsten oxide and the influencing material is cadmium sulfide.

8. The coating of claim 4, wherein a reactive material, which increases the coloring of the coating, is disposed between the photochromic material and the influencing material.

9. The coating of claim 8, wherein the reactive material comprises at least one substance selected from the group consisting of
   water,
   a nonvolatile substance which remains in the coating and comprises hydrogen, which is linked by a polar bond and can be split off as a proton,
   a polysaccharide, and
   a polyvinyl alcohol.

10. The coating of claim 4, wherein the coating comprises a plurality of alternating layers of photochromic material and influencing material.

11. A method of making a coating comprising applying at least one pair of alternating layers of a photochromic material and an influencing material, wherein the photochromic material has an optically reversible photochromic effect which sets in at a certain wavelength.

12. The method of claim 11, comprising successively vapor-depositing the influencing material and the photochromic material on a substrate.

13. The method of claim 12, wherein the substrate is glass.

14. The method of claim 11, further comprising applying a reactive material between the photochromic material and the influencing material.

15. The method of claim 14, wherein the reactive material is water vapor.

16. The method of claim 11, comprising incorporating the coating into an optical memory unit.

17. The method of claim 11, comprising applying the coating as an exposing material for holographic structures.

18. The method of claim 11, comprising applying the coating as a material for producing optical gratings.

19. The method of claim 11, comprising incorporating the coating into an effect material for paints.

20. The method of claim 11, further comprising comminuting the coating and incorporating the comminuted coating as a pigment in an effect paint for an object to be painted.

21. The method of claim 20, wherein the object is a motor vehicle.

22. The method of claim 11, comprising applying the coating to an object as insulation from light waves and/or light intensity.

23. The method of claim 22, wherein the object is a building.

24. The method of claim 11, comprising applying the coating as a coating for glass panes.

25. The method of claim 24, wherein the glass panes are motor vehicle windows.

26. A coating material for a substrate, comprising:

a photochromic material having an optically reversible photochromic effect and a switching threshold outside of the visible spectral range;

an influencing material coated on the photochromic material, thereby shifting the switching threshold of the coated photochromic material toward greater wavelengths than the switching threshold of the uncoated photochromic material; and a reactive material disposed between the photochromic material and the influencing material for increasing the color depth of the coating;

wherein, a contact between the photochromic material and the influencing material is capable of transporting charge carriers;

the influencing material has a smaller band gap between an electronic valence band and an electronic conductivity band than the photochromic material;

the charge carriers of the influencing material can be activated within the visible spectral range;

heeding any potential barrier, a quantum mechanical transition matrix element greater than zero exists for at least for one kind of charge carrier with regard to charge carrier transport between the influencing material and the photochromic material; and the potential barrier is less than the difference between the band gap of the photochromic material and the influencing material.

* * * * *